US009122339B2

(12) United States Patent
Yang (10) Patent No.: US 9,122,339 B2
(45) Date of Patent: Sep. 1, 2015

(54) TOUCH DISPLAY CIRCUIT AND DRIVING METHOD THEREOF, ARRAY SUBSTRATE AND DISPLAY APPARATUS

(71) Applicant: BEIJING BOE OPTOELECTRONICS TECHNOLOGY CO., LTD., Beijing (CN)

(72) Inventor: Shengji Yang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 14/108,947

(22) Filed: Dec. 17, 2013

(65) Prior Publication Data

US 2014/0168127 A1 Jun. 19, 2014

(30) Foreign Application Priority Data

Dec. 18, 2012 (CN) .......................... 2012 1 0552913

(51) Int. Cl.
G06F 3/041 (2006.01)

(52) U.S. Cl.
CPC ............ *G06F 3/0412* (2013.01); *G06F 3/0416* (2013.01)

(58) Field of Classification Search
CPC ......... G09G 3/30; G09G 3/32; G09G 3/3225; G09G 3/3233; G06F 3/041; G06F 3/0412; G06F 3/0416
See application file for complete search history.

(56) References Cited

U.S. PATENT DOCUMENTS

| 2006/0125737 | A1 | 6/2006 | Kwak et al. |
| 2012/0044176 | A1 | 2/2012 | Nakamura et al. |
| 2013/0050116 | A1* | 2/2013 | Shin et al. ..................... 345/173 |
| 2013/0249857 | A1* | 9/2013 | Kimura ......................... 345/174 |
| 2013/0321249 | A1* | 12/2013 | Kimura ......................... 345/76 |
| 2014/0118231 | A1 | 5/2014 | Yang et al. |

FOREIGN PATENT DOCUMENTS

| CN | 1779765 A | 5/2006 |
| CN | 1779767 A | 5/2006 |
| CN | 102708819 A | 10/2012 |
| CN | 203084684 U | 7/2013 |

OTHER PUBLICATIONS

First Chinese Office Action Appln. No. 201210552913.5; Dated Apr. 17, 2015.

\* cited by examiner

*Primary Examiner* — Regina Liang
(74) *Attorney, Agent, or Firm* — Ladas & Parry LLP (57) ABSTRACT

Embodiments of the present disclosure relate to a field of display manufacture, particularly provide a touch display circuit and a driving method thereof, an array substrate and a display apparatus, which may reduce manufacture processes in a production phase of a touch display product and save cost, and may also enhance an aperture ratio of the product and increase an additional value. The touch display circuit comprises a touch unit and a display unit; the touch unit is connected with a data line, a first scan line, a second scan line, a signal acquiring line and a first signal control line; the display unit is connected with the data line, the first scan line, the second scan line and a second signal control line; the embodiments of the present disclosure can be applied to the field of manufacturing a display.

16 Claims, 5 Drawing Sheets

TOUCH DISPLAY CIRCUIT AND DRIVING METHOD THEREOF, ARRAY SUBSTRATE AND DISPLAY APPARATUS

TECHNICAL FIELD

The present invention relates to a field of display technique, and particularly, to a touch display circuit and a driving method thereof, an array substrate and a display apparatus.

BACKGROUND

An Active Matrix Organic Light Emitting Diode (AMOLED) is a focus in a research field of a panel display. As compared with a liquid crystal display, the Organic Light Emitting Diode (OLED) display has advantages of low power consumption, low manufacturing cost, self-luminous, wide angle of view and rapid response speed, etc, and starts to replace a traditional Liquid Crystal Display (LCD) display in display fields such as a mobile phone, a Personal Digital Assistant (PDA), a digital camera and the like. A technique known as In cell touch has been applied to the LCD display currently, and has been utilized massively by many first-tier producers in the industry successfully. However the In cell touch products still fail to replace the Add on (attaching a capacitive film for touching on a light-exporting side at the display apparatus) products and One Glass Solution (OGS) products totally in the market due to restrictions on patent technology and yield. Further, products which combine the AMOLED and the In Cell touch are relative immature, and in the processes for manufacturing such products, there are problems that the processes for manufacturing the products are complex and aperture ratios of the finished-products are low.

SUMMARY

Embodiments of the present disclosure provide a touch display circuit and a driving method thereof, an array substrate and a display apparatus, which may reduce manufacture processes in a production phase of a touch display product and save cost, and may also enhance an aperture ratio of the product and increase an additional value.

In view of this, the embodiments of the present disclosure utilize solutions as follows.

In an aspect, there is provided a touch display circuit comprising a touch unit and a display unit;

wherein the touch unit comprises a first switch transistor, a second switch transistor, a first capacitor, a touch electrode and an amplifying transistor;

a source of the first switch transistor is connected with a data line, and a gate of the first switch transistor is connected with a first signal control line;

a first terminal of the touch electrode is connected with a drain of the first switch transistor;

a gate of the amplifying transistor is connected with a second terminal of the touch electrode, and a source of the amplifying transistor is connected with a second scan line;

a gate of the second switch transistor is connected with a first scan line or the second scan line, a source of the second switch transistor is connected with a drain of the amplifying transistor, and a drain of the second switch transistor is connected with a signal acquiring line;

a first electrode of the first capacitor is connected with the second scan line, and a second electrode of the first capacitor is connected with a third terminal of the touch electrode;

the display unit comprises a light-emitting module, a second capacitor, a driving transistor, a third switch transistor, a fourth switch transistor, a fifth switch transistor and a sixth switch transistor;

a gate of the third switch transistor is connected with a second signal control line, a source of the third switch transistor is connected with a first level terminal, and a drain of the third switch transistor is connected with a first electrode of the second capacitor;

a gate of the fourth switch transistor is connected with the first scan line or the second scan line; a source of the fourth switch transistor is connected with a low level terminal; and a drain of the fourth switch transistor is connected with a second electrode of the second capacitor;

a gate of the fifth switch transistor is connected with the first scan line or the second scan line, and a source of the fifth switch transistor is connected with the second electrode of the second capacitor;

a gate of the sixth switch transistor is connected with the first scan line or the second scan line, a source of the sixth switch transistor is connected with the data line, and a drain of the sixth switch transistor is connected with a drain of the fifth switch transistor;

a gate of the driving transistor is connected with the drain of the sixth switch transistor, and a source of the driving transistor is connected with the first electrode of the second capacitor;

the light-emitting module is connected with the first scan line or the second scan line, a drain of the driving transistor and a second level terminal, and the light-emitting module is controlled by the first scan line or the second scan line, the drain of the driving transistor and the second level terminal to emit light.

Optionally, the light-emitting module is further connected with the low level terminal, and the light-emitting module comprises a seventh switch transistor and a light-emitting device;

a gate of the seventh switch transistor is connected with the first scan line or the second scan line, a source of the seventh switch transistor is connected with the drain of the driving transistor, and a drain of the seventh switch transistor is connected with the low level terminal;

one electrode of the light-emitting device is connected with the drain of the driving transistor, and the other electrode of the light-emitting device is connected with the second level terminal.

Optionally, the light-emitting module comprises a seventh switch transistor and a light-emitting device;

a gate of the seventh switch transistor is connected with the first scan line or the second scan line, and a source of the seventh switch transistor is connected with the drain of the driving transistor;

one electrode of the light-emitting device is connected with the drain of the seventh switch transistor, and the other electrode of the light-emitting device is connected with the second level terminal.

Optionally, turn-on time of the fifth switch transistor and that of the fourth switch transistor do not overlap.

Optionally, the second switch transistor, the fourth switch transistor and the sixth switch transistor are switch transistors having a same type, and their gates are all connected with a same scan line.

Optionally, when the second switch transistor, the fourth switch transistor and the sixth switch transistor are P-type transistors, their gates are all connected with the first scan line; alternatively, when the second switch transistor, the fourth switch transistor and the sixth switch transistor are N-type transistors, their gates are all connected with the second scan line.

Optionally, when the fifth switch transistor is a P-type transistor, its gate is connected with the second scan line, and when the fifth switch transistor is an N-type transistor, its gate is connected with the first scan line.

Optionally, both of the driving transistor and the amplifying transistor are the P-type transistors.

Optionally, the driving transistor, the amplifying transistor, and the respective switch transistors are all the P-type transistors.

In another aspect, there is provided a driving method for a touch display circuit, comprising:

in a first phase, a first switch transistor and a fifth switch transistor are both turned on, a second switch transistor, a third switch transistor, a fourth switch transistor, a sixth switch transistor, a driving transistor and an amplifying transistor are all turned off, a data line inputs a reset signal of a high level, and a voltage at a touch electrode rises;

in a second phase, the first switch transistor and the fifth switch transistor are turned off, the second switch transistor, the third switch transistor, the fourth switch transistor, the sixth switch transistor and the amplifying transistor are turned on, and a first level terminal charges a second capacitor;

in a third phase, the first switch transistor, the third switch transistor and the fifth switch transistor are turned off, the second switch transistor, the fourth switch transistor, and the sixth switch transistor are turned on, a second scan line provides a coupling pulse signal of a high level, a second electrode of a first capacitor is discharged until a voltage difference between a gate and a source of the amplifying transistor is equal to a threshold voltage of the amplifying transistor when the touch electrode is touched, the amplifying transistor amplifies the coupling pulse signal provided from the second scan line and outputs the same to a signal acquiring line, and the second capacitor is discharged until the voltage difference between the gate and the source of the driving transistor is equal to the threshold voltage of the driving transistor;

in a fourth phase, the first switch transistor, the second switch transistor, the fourth switch transistor, the sixth switch transistor and the amplifying transistor are turned off, the third switch transistor and the fifth switch transistor are turned on, and the first level terminal and the second level terminal apply a light-emitting signal to a light-emitting module.

Optionally, the light-emitting module comprises a seventh switch transistor and a light-emitting device, and when a source and a drain of the seventh switch transistor are connected with two electrodes of the light-emitting device in parallel, the method further comprises:

the seventh switch transistor is turned off in the first phase;
the seventh switch transistor is turned on in the second phase;
the seventh switch transistor is turned on in the third phase; and
the seventh switch transistor is turned off in the fourth phase, and the first level terminal and the second level terminal apply a turn-on signal to the light-emitting device.

Optionally, the light-emitting module comprises a seventh switch transistor and a light-emitting device, and when a source and a drain of the seventh switch transistor are connected with two electrodes of the light-emitting device in series, the method further comprises:

the seventh switch transistor is turned on in the first phase;
the seventh switch transistor is turned off in the second phase;
the seventh switch transistor is turned off in the third phase; and
the seventh switch transistor is turned on in the fourth phase, and the first level terminal and the second level terminal apply a turn-on signal to the light-emitting device.

Optionally, turn-on time of the fifth switch transistor and that of the fourth switch transistor do not overlap.

Optionally, both of the driving transistor and the amplifying transistor are the P-type transistors.

In a still aspect, there is provided an array substrate comprising any of touch display circuits described above.

In a further aspect, there is provided a display apparatus comprising the array substrate described above.

In the touch display circuit and the driving method thereof, the array substrate and the display apparatus according to the embodiments of the present disclosure, a circuit of the touch unit and a circuit of the display unit are integrated together, so that the touch display circuit according to the embodiments of the present disclosure may be made simultaneously through a manufacture process for the display unit, which may in turn reduce manufacture processes in a production phase of a touch display product and save cost, and may also enhance an aperture ratio of the product and increase an additional value.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only show some embodiments of the present disclosure, but those ordinary skilled in the art may obtain other drawings according to these drawings without any inventive labors.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure. Any other embodiments obtained by those ordinary skilled in the art based on the embodiments of the present disclosure without inventive labors should fall into a scope sought for protection in the present disclosure.

Switch transistors, amplifying transistors and driving transistors utilized in all embodiments of the present disclosure may be thin film transistors or field effect transistors or any other devices having similar characteristics. A source and a drain of the switch transistor utilized herein are symmetrical, therefore the source and the drain may be exchanged. In the embodiments of the present disclosure, in order to distinguish the two electrodes except for the gate of the transistor, one electrode is referred to as the source and the other electrode is referred to as the drain. As shown in the drawings, it is specified that a middle terminal of the transistor is the gate, a signal inputting terminal is the source and a signal outputting terminal is the drain. Further, the switch transistors utilized in the embodiments of the present disclosure comprise P-type switch transistors and N-type switch transistors, wherein the P-type switch transistor is turned on when its gate is at a low level and turned off when its gate is at a high level; while the N-type switch transistor is turned on when its gate at in the high level and is turned off when its gate is at the low level. The amplifying transistor and the driving transistor comprise N-type and P-type, wherein the P-type amplifying transistor or driving transistor is in an amplifying state when a gate voltage is at the low level (the gate voltage is smaller than a source voltage) and an absolute value of a voltage difference between the gate and source is greater than the threshold voltage, an voltage input to the source may be output at the drain after being amplified; wherein the N-type amplifying transistor or driving transistor is in the amplifying state when the gate voltage is at the high level (the gate voltage is greater than a source voltage) and the absolute value of the voltage difference between the gate and source is greater than the threshold voltage, the voltage input to the source may be output at the drain after being amplified. The embodiments of the present disclosure only utilize the P-type amplifying transistor and P-type driving transistor as examples.

Figure 1:
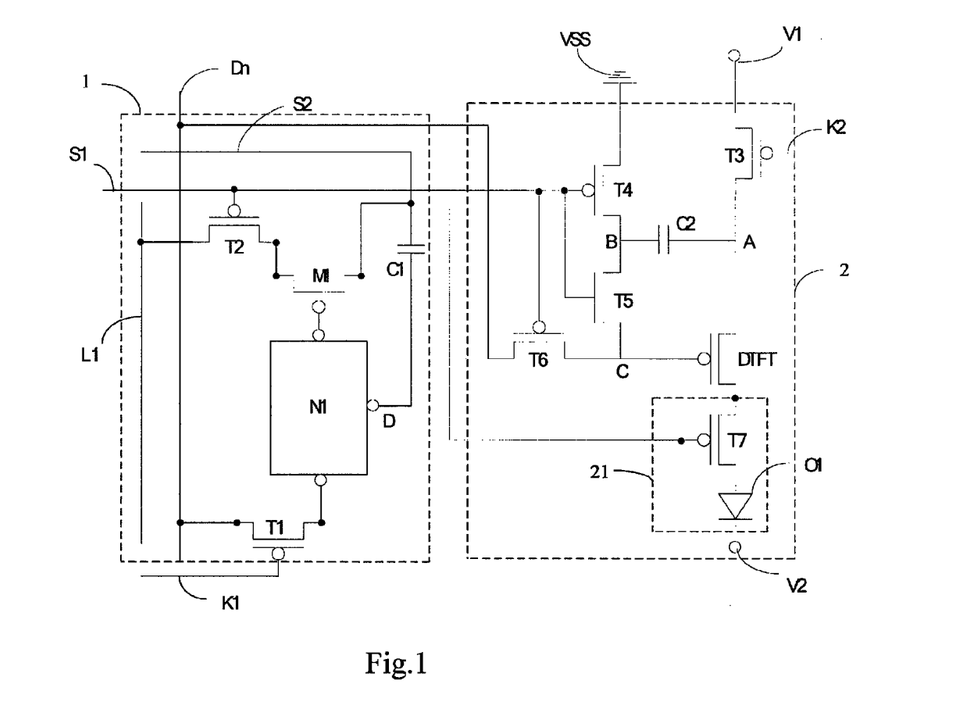
FIG. 1 is an exemplary view illustrating a circuit of a touch display circuit according to an embodiment of the present disclosure.
Figure 2:
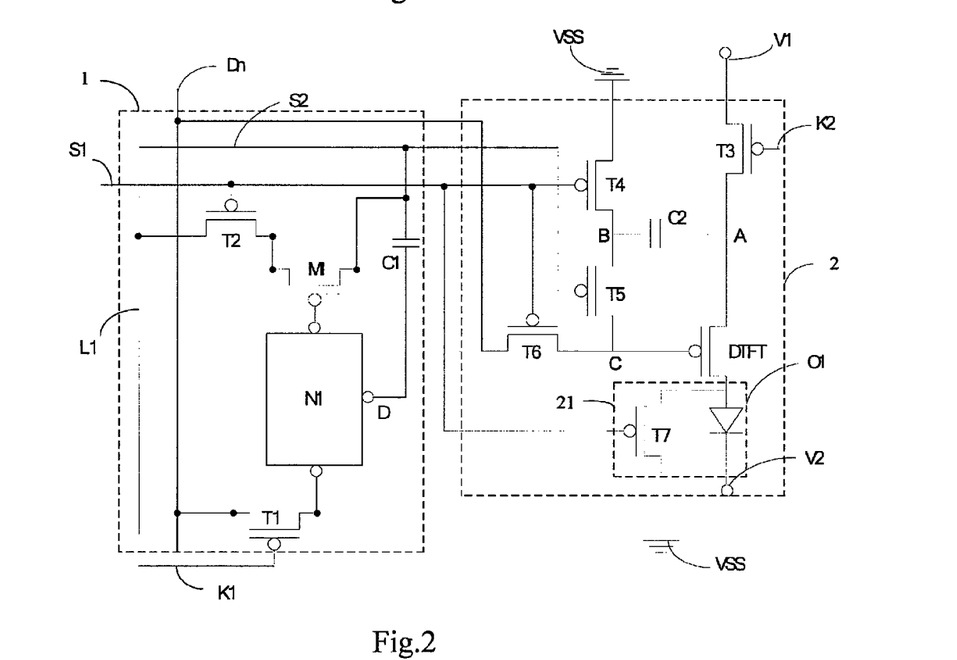
FIG. 2 is an exemplary view illustrating a circuit of a touch display circuit according to another embodiment of the present disclosure.

As illustrated in FIGS. 1 and 2, a touch display circuit comprising a touch unit 1 and a display unit 2.

In an example, the touch unit 1 is connected with a data line Dn, a first scan line S1, a second scan line S2, a signal acquiring line L1 and a first signal control line K1;

the display unit 2 is connected with the data line Dn, the first scan line S1, the second scan line S2 and a second signal control line K2;

wherein the touch unit 1 comprises a first switch transistor T1, a second switch transistor T2, a first capacitor C1, a touch electrode N1 and an amplifying transistor M1;

a source of the first switch transistor T1 is connected with the data line Dn, and a gate of the first switch transistor T1 is connected with the first signal control line K1;

the touch electrode N1 is connected with a drain of the first switch transistor T1;

a gate of the amplifying transistor M1 is connected with the touch electrode N1, and a source of the amplifying transistor M1 is connected with the second scan line S2;

a gate of the second switch transistor T2 is connected with the first scan line S1 (as illustrated in FIGS. 1 and 2) or the second scan line S2 (not shown in the drawings), a source of the second switch transistor T2 is connected with a drain of the amplifying transistor M1, and a drain of the second switch transistor T2 is connected with the signal acquiring line L1;

a first electrode of the first capacitor C1 is connected with the second scan line S2, and a second electrode of the first capacitor C1 is connected with the touch electrode N1;

the display unit 2 comprises a light-emitting module 21, a second capacitor C2, a driving transistor DTFT, a third switch transistor T3, a fourth switch transistor T4, a fifth switch transistor T5, a sixth switch transistor T6 and a seventh switch transistor T7;

a gate of the third switch transistor T3 is connected with the second signal control line K2, a source of the third switch transistor T3 is connected with a first level terminal V1, and a drain of the third switch transistor T3 is connected with a first electrode of the second capacitor C2;

a gate of the fourth switch transistor T4 is connected with the first scan line S1 (as illustrated in FIGS. 1 and 2) or the second scan line S2 (not shown); a source of the fourth switch transistor T4 is connected with a low level terminal VSS, and a drain of the fourth switch transistor T4 is connected with a second electrode of the second capacitor C2;

a gate of the fifth switch transistor T5 is connected with the second scan line S2 (as illustrated in FIG. 2) or the first scan line S1 (as illustrated in FIG. 1), and a source of the fifth switch transistor T5 is connected with the second electrode of the second capacitor C2;

a gate of the sixth switch transistor T6 is connected with the first scan line S1 (as illustrated in FIGS. 1 and 2) or the second scan line S2 (not shown in drawings), a source of the sixth switch transistor T6 is connected with the data line Dn, and a drain of the sixth switch transistor T6 is connected with a drain of the fifth switch transistor T5;

a gate of the driving transistor DTFT is connected with the drain of the sixth switch transistor T6, and a source of the driving transistor DTFT is connected with the first electrode of the second capacitor C2;

the light-emitting module 21 is connected with the first scan line S1 (as illustrated in FIG. 2) or the second scan line S2 (as illustrated in FIG. 1), a drain of the driving transistor DTFT and a second level terminal V2, and the light-emitting module 21 is controlled by the first scan line S1 or the second scan line S2, the drain of the driving transistor DTFT and the second level terminal V2 to emit light.

In an example, as illustrated in FIG. 1, the light-emitting module 21 further comprises the seventh switch transistor T7 and a light-emitting device O1;

a gate of the seventh switch transistor T7 is connected with the first scan line S1 (not shown in FIG. 1) or the second scan line S2 (as illustrated in FIG. 1), a source of the seventh switch transistor T7 is connected with the drain of the driving transistor DTFT;

one electrode of the light-emitting device O1 is connected with a drain of the seventh switch transistor T7, and the other electrode of the light-emitting device O1 is connected with the second level terminal V2.

In an example, as illustrated in FIG. 2, the light-emitting module 21 is further connected with the low level terminal VSS, and comprises a seventh switch transistor T7 and a light-emitting device O1;

a gate of the seventh switch transistor T7 is connected with the first scan line S1 (as illustrated in FIG. 2) or the second scan line S2 (not shown in FIG. 2), a source of the seventh switch transistor T7 is connected with the drain of the driving transistor DTFT, and a drain of the seventh switch transistor T7 is connected with the low level terminal VSS;

one electrode of the light-emitting device O1 is connected with the drain of the driving transistor DTFT, and the other electrode of the light-emitting device O1 is connected with the second level terminal V2.

Of course the light-emitting device O1 in FIGS. 1 and 2 may be an active Organic Light Emitting Diode. A level $V_2$ at the second level terminal is lower than a level $V_1$ at the first level terminal when the OLED is a bottom-emitting type OLED. In an example, the low level terminal is a ground terminal. Of course the FIGS. 1 and 2 take the bottom-emitting type OLED as an example.

In an example, the second switch transistor T2, the fourth switch transistor T4 and the sixth switch transistor T6 are switch transistors having a same type, and their gates are all connected with a same scan line. In the above embodiments, the fifth switch transistor T5 may not be turned on simultaneously with the fourth switch transistor T4 and the sixth switch transistor T6, therefore in an example, when the fourth switch transistor T4, the sixth switch transistor T6 and the fifth switch transistor T5 are the transistors having the same type, both gates of the fourth switch transistor T4 and the sixth switch transistor T6 are connected with the first scan line S1, while the gate of the fifth switch transistor T5 is connected with the second scan line S2.

In an example, both of the driving transistor DTFT and the amplifying transistor M1 are the P-type transistors. In an example, the driving transistor DTFT, the amplifying transistor M1, and the respective switch transistors (T1~T7) are all the P-type transistors. Thus the consistency in the types of the respective transistors also benefits the reduction of the preparation technical processes and ensures uniform performance of the components.

The types of the respective switch transistors whose gates are connected with the scan lines (the first scan line S1 or the second scan line S2) have no limitations, and may be either the N-type or the P-type. FIG. 2 is illustrated by taking a case in which all of the switch transistors are P-type as an example, but the types of transistors may be changed suitably, and after the types of the corresponding switch transistors are changed, the scan lines connected to their gates are also required to be adjusted (in a case that the signals on the scan lines are unchanged relatively, the first scan line S1 is adjusted to serve as the second scan line S2, or the second scan line S2 is adjusted to serve as the first scan line S1), and such variants should fall into a scope sought for protection of the present disclosure. The first switch transistor T1 and the third switch transistor T3 are controlled by separate signal lines, respectively, therefore the first switch transistor T1 and the third switch transistor T3 may be the P-type transistors or the N-type transistors.

In the touch display circuit according to the embodiments of the present disclosure, a circuit of the touch unit and a circuit of the display unit are integrated together, so that the touch display circuit according to the embodiments of the present disclosure may be made simultaneously through a manufacture process for the display unit, which may in turn reduce manufacture processes in a production phase of a touch display product and save cost, and may also enhance an aperture ratio of the product and increase an additional value. Particularly, the embodiments of the present disclosure combine two signal scan lines and one data line (Vdata) required for the AMOLED driving circuit of the display unit and the circuit of the touch unit (in cell touch) together, and achieve an effective integration for functions of the AMOLED display and the in cell touch. Further, in the display unit, an affect on a driving current of the active light-emitting device by a drift of the threshold voltage of the driving transistor may be avoided in a manner of voltage compensation, and in turn enhancing uniformity in the image displayed.

Referring to the touch display circuit according to the embodiments of the present disclosure, the embodiments of the present disclosure further provide a driving method for the touch display circuit provided in the embodiments of the present disclosure:

in a first phase, a first switch transistor T1 and a fifth switch transistor T5 are both turned on, a second switch transistor T2, a third switch transistor T3, a fourth switch transistor T4, a sixth switch transistor T6, a driving transistor DTFT and an amplifying transistor M1 are all turned off, a data line Dn inputs a reset signal of a high level, and a voltage at a touch electrode N1 rises;

in a second phase, the first switch transistor T1 and the fifth switch transistor T5 are turned off, the second switch transistor T2, the third switch transistor T3, the fourth switch transistor T4, the sixth switch transistor T6 and the amplifying transistor M1 are turned on, and a first level terminal V1 charges a second capacitor C2;

in a third phase, the first switch transistor T1, the third switch transistor T3 and the fifth switch transistor T5 are turned off, the second switch transistor T2, the fourth switch transistor T4, and the sixth switch transistor T6 are turned on, a second scan line S2 provides a coupling pulse signal of the high level, a second electrode of a first capacitor C1 is discharged until a voltage difference between a gate and a source of the amplifying transistor M1 is equal to a threshold voltage of the amplifying transistor M1 when the touch electrode N1 is touched, the amplifying transistor M1 amplifies the coupling pulse signal provided from the second scan line S2 and outputs the same to a signal acquiring line L1, and the second capacitor C2 is discharged until the voltage difference between the gate and the source of the driving transistor DTFT is equal to the threshold voltage of the driving transistor DTFT;

in a fourth phase, the first switch transistor T1, the second switch transistor T2, the fourth switch transistor T4, the sixth switch transistor T6 and the amplifying transistor M1 are turned off, the third switch transistor T3 and the fifth switch transistor T5 are turned on, the first level terminal V1 and the second level terminal V2 apply a light-emitting signal to a light-emitting device O1.

In an example, when the light-emitting module 21 illustrated in FIG. 1 is used, the light-emitting module 21 comprises a seventh switch transistor T7 and a light-emitting device O1, and a source and a drain of the seventh switch transistor T7 are connected with two electrodes of the light-emitting device O1 in series, then the method further comprises:

the seventh switch transistor T7 is turned on in the first phase;

the seventh switch transistor T7 is turned off in the second phase;

the seventh switch transistor T7 is turned off in the third phase; and the seventh switch transistor T7 is turned on in the fourth phase, and the first level terminal V1 and the second level terminal V2 apply a turn-on signal to the light-emitting device O1.

In an example, when the light-emitting module 21 illustrated in FIG. 2 is used, the light-emitting module 21 comprises a seventh switch transistor T1 and a light-emitting device O1, and a source and a drain of the seventh switch transistor T7 are connected with two electrodes of the light-emitting device O1 in parallel, then the method further comprises:

the seventh switch transistor T7 is turned off in the first phase;

the seventh switch transistor T7 is turned on in the second phase;

the seventh switch transistor T7 is turned on in the third phase; and the seventh switch transistor T7 is turned off in the fourth phase, the first level terminal V1 and the second level terminal V2 apply a turn-on signal to the light-emitting device O1.

In an example, both of the driving transistor DTFT and the amplifying transistor M1 are the P-type transistors, and both of the first switch transistor T1 and the third switch transistor T3 are the P-type transistors or the N-type transistors.

The description herein takes a case in which the first switch transistor T1, the second switch transistor T2, the third switch transistor T3, the fourth switch transistor T4, the fifth switch transistor T5, the sixth switch transistor T6, the seventh switch transistor T7, the amplifying transistor M1 and the driving transistor DTFT are the P-type transistors as an example. Referring to the circuit diagram illustrated in FIG. 2 and the exemplary view illustrating the signal timing states of the touch display circuit shown in FIG. 3, a driving method for the touch display circuit according to the embodiments of the present disclosure will be described in details thereafter.

Figure 3:
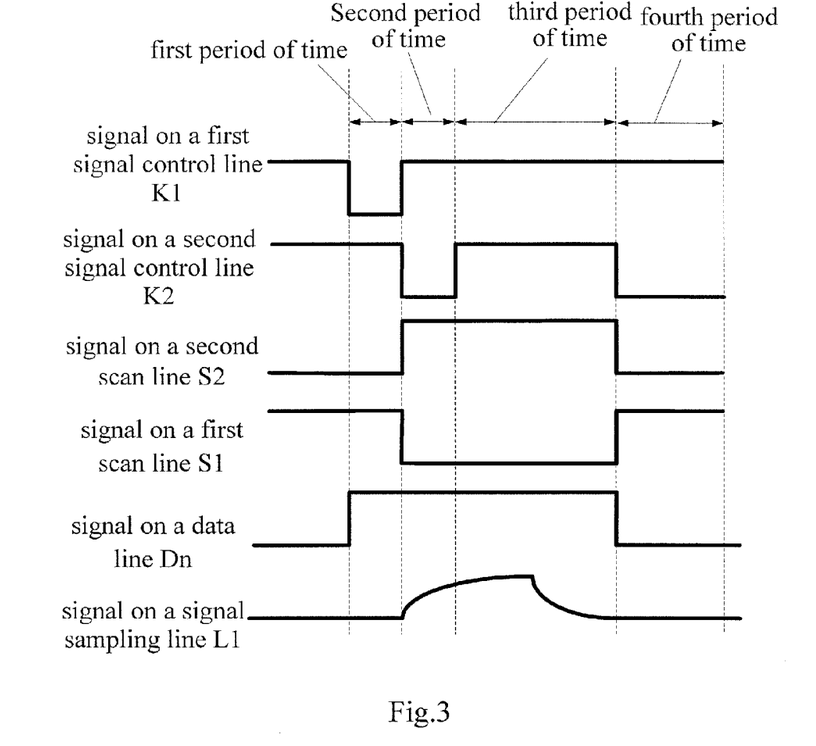
FIG. 3 is an exemplary view illustrating signal timing states of the touch display circuit shown in FIG. 2 according to the embodiments of the present disclosure.

In particular, in the first phase, that is, a first period of time in the exemplary view illustrating the signal timing states in FIG. 3, the first signal control line K1 and the second scan line S2 apply a low level signal respectively, the second signal control line K2, the first scan line S1 and the data line Dn apply a high level signal respectively, the first switch transistor T1 of the touch unit is turned on, at this time a reset signal of the high level applied from the data line Dn charges the first capacitor C1 connected with the touch electrode N1, a voltage at a node D connected with the touch electrode N1 rises to Vg at this time. This process prepares for a next phase. The fifth switch transistor T5 of the display unit is turned on, and other transistors are in an OFF state, therefore the display unit does not operate.

Figure 4:
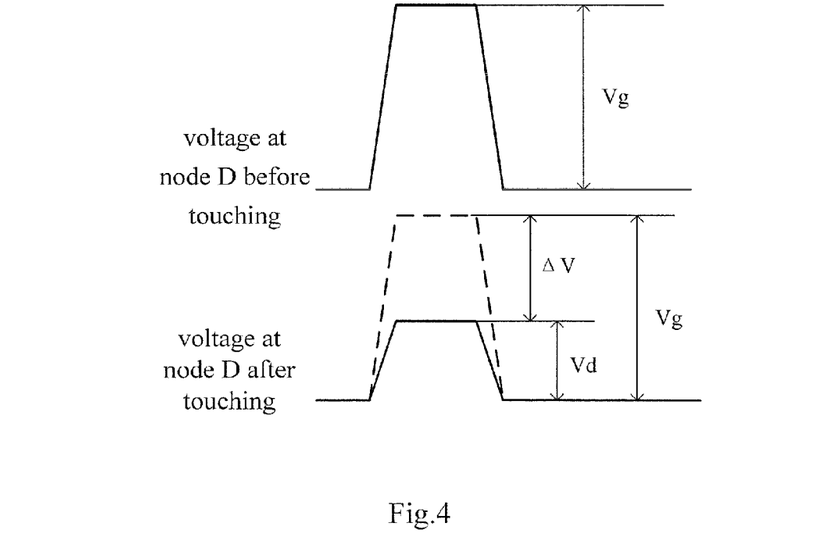
FIG. 4 is an exemplary view illustrating changes in a voltage at a touch electrode of the touch display circuit according to the embodiments of the present disclosure.

In the second phase, that is, the second period of time in the exemplary view illustrating the signal timing states in FIG. 3, the first signal control line K1, the second scan line S2, and the data line Dn apply the high level signal respectively, the second signal control line K2 and the first scan line S1 apply the low level signal respectively, the first switch transistor of the touch unit is turned off, the second switch transistor T2 and the amplifying transistor M1 are turned on. During this phase, the second scan line S2 in the touch unit provides the high level to one electrode of the first capacitor, therefore a coupling capacitance is formed. Referring to FIG. 4, a voltage at the touch electrode N1 would drop when a finger touches above the touch electrode N1 because the voltage Vg (the voltage at the node D) has been formed at the touch electrode N1 in the first phase during which the first capacitor is charged, and the amplifying transistor M1 may output an amplified signal to the signal acquiring line L1 via its drain when an absolute value of a difference between the gate voltage and the source voltage of the amplifying transistor M1 is greater than a turn-on threshold voltage of the amplifying transistor M1. This phase waits for a touch event to occur on the touch electrode. In this phase, the signal on the second scan line S2 is relatively fixed, because the second scan line S2 needs to provide the high level to the source of the amplifying transistor M1 in order to form a turn-on condition for the amplifying transistor M1, that is, the absolute value of the difference between the gate voltage and the source voltage is greater than the turn-on threshold voltage (source voltage is greater than the gate voltage), after the touch event occurs on the touch electrode N1 and the voltage at the gate of the amplifying transistor M1 drops.

Figure 5:
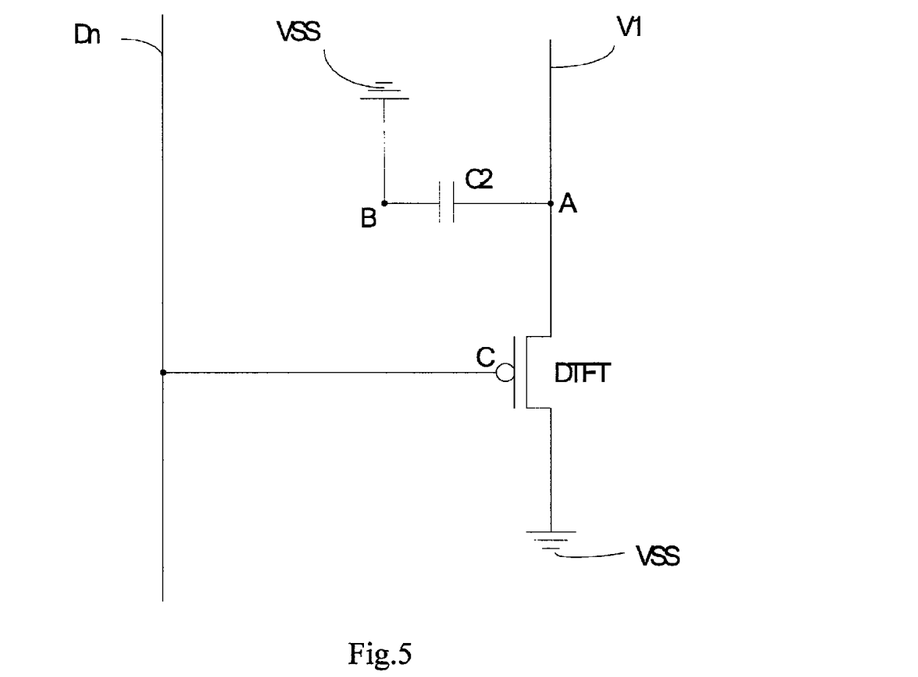
FIG. 5 is an exemplary view illustrating an equivalent circuit of a display unit in a second period of time according to the embodiments of the present disclosure.

Meanwhile, in the second phase, the third switch transistor T3, the fourth switch transistor T4, the sixth switch transistor T6 and the seventh switch transistor T7 of the display unit are turned on, and the fifth switch transistor T5 is turned off. At this time, two terminals of the active light-emitting diode OLED are short-circuited since the seventh switch transistor T7 is turned on, and the first level terminal charges the second capacitor C2. An equivalent circuit diagram formed at this time is as illustrated in FIG. 5, a voltage at the first electrode of the second capacitor C2, that is, at the node A in the figure, is charged to a voltage equal to the voltage at the first level terminal, and at this time the voltage at the node A, $V_A$, is equal to the voltage at the first level terminal, $V_1$. The second electrode of the second capacitor C2 is connected with a low level terminal, then a voltage at the second electrode, that is, a voltage at node B, $V_B$=0. Similarly, if the light-emitting module 21 shown in FIG. 1 is used, the seventh switch transistor T7 is turned off at this time so as to isolate the active light-emitting diode OLED from the driving transistor DTFT, and its function is as same as that in FIG. 2, therefore details are omitted herein.

In the third phase, that is, a third period of time in the exemplary view illustrating the signal timing states in FIG. 3, the first signal control line K1, the second scan line S2, the second signal control line K2 and the data line Dn apply the high level signal respectively, and the first scan line S1 applies the low level signal, the first switch transistor T1 of the touch unit is turned off, and the second switch transistor T2 of the touch unit is turned on. The voltage at the touch electrode would drop when the finger touches above the touch electrode N1, at this time a coupling voltage provided for the first capacitor by the second scan line S2 may also hold the source voltage of the amplifying transistor M1. Since the gate of the amplifying transistor M1 is connected with the touch electrode N1, when voltage drop ΔV which is generated as the voltage at the touch electrode N1 drops to Vd satisfies the turn-on condition of the amplifying transistor M1 (herein the turn-on condition refers to the condition in which the absolute value of the difference between the gate voltage and the source voltage is greater than the turn-on threshold voltage of the transistor, and in this example, the gate voltage is smaller than the source voltage when the transistor is turned on because the P-type transistor is utilized), the amplifying transistor M1 is turned on and in an amplification state. The amplifying transistor M1 may amplify the high level signal on the second scan line S2 and output the same to the signal acquiring line L1 (referring to the timing state diagram of the signal acquiring line illustrated in FIG. 3, there is a process during which the voltage rises on the signal acquiring line L1) because the second switch transistor T2 is turned on. At this time, a touch position may be located by determining a first coordinate direction using the first scan line S1 and determining a second coordinate direction being perpendicular to the first coordinate direction using changes in the signal output from the signal acquiring line L1. Herein, the signal on the first scan line S1 serves as a signal in an X-axis coordinate direction, while the signal on the signal acquiring line L1 serves as a signal in a Y-axis coordinate direction. The coordinate in the X-axis direction may be determined when the first scan line S1 inputs a signal. At this time, the amplifying transistor M1 may amplify the high level signal on the second scan line S2 and output the same to the signal acquiring line L1 because the second switch transistor T2 is turned on, such that coordinate positions in the two axes of X, Y may be determined at the same time if the change situation in the signal on the signal acquiring line L1 is detected. Accordingly, the touch position is determined. Of course, the amplifying transistor M1 may be turned off after the absolute value of the difference between the gate voltage and the source voltage is smaller than the turn-on threshold voltage because the touch electrode N1 may not remain the previous low voltage Vd after the touch ends, and in turn the voltage on the signal acquiring line L1 drops rapidly.

Figure 6:
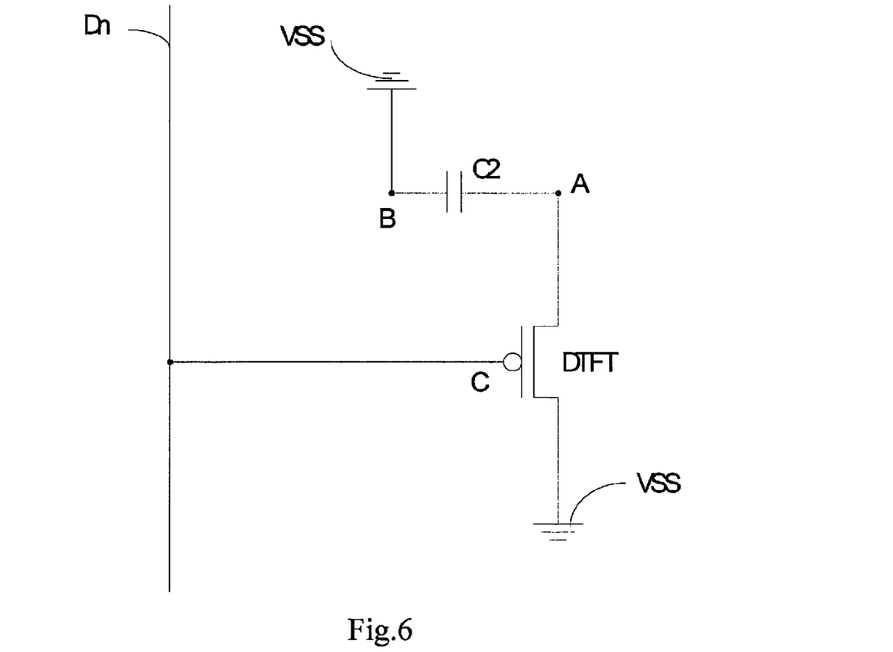
FIG. 6 is an exemplary view illustrating an equivalent circuit of the display unit in a third period of time according to the embodiments of the present disclosure.

Meanwhile, in the third phase, the fourth switch transistor T4, the sixth switch transistor T6, the seventh switch transistor T7 of the display unit are turned on, and the third switch transistor T3 and the fifth switch transistor T5 are turned off. At this time, the two terminals of the active light-emitting diode OLED are still short-circuited because the seventh switch transistor T7 is turned on, and the second capacitor C2 is discharged until the voltage difference between the gate and the source of the driving transistor DTFT is equal to the threshold voltage of the driving transistor DTFT. The equivalent circuit diagram formed at this time is shown in FIG. 6. During this process, the first electrode of the second capacitor C2, that is the node A in the figure, starts to be discharged, until $V_A - V_C = V_{th}$, wherein $V_A$ is a voltage at the node A, $V_C$ is a voltage at a node C, which is the gate voltage of the driving transistor DTFT, and $V_C = V_{data}$ at this time, wherein $V_{data}$ is a voltage value provided from the data line, $V_{th}$ is the threshold voltage of the driving transistor DTFT, at last the voltage at the node A becomes $V_{data} + V_{th}$. This phase is a compensation phase, and functions as buffering in order to prepare for a next phase. Similarly, if the light-emitting module 21 shown in FIG. 1 is used, the seventh switch transistor T7 is turned off at this time so as to insulate the active light-emitting diode OLED from the driving transistor DTFT, and its function is as same as that in FIG. 2, therefore details are omitted herein.

In the fourth phase, that is, the fourth period of time in the exemplary view illustrating the signal timing states in FIG. 3, the first signal control line K1 and the first scan line S1 apply the high level signal respectively, the second signal control line K2, the second scan line S2 and the data line Dn apply the low level signal respectively, the first switch transistor T1, the second switch transistor T2 and the amplifying transistor M1 of the touch unit are turned off. The touch operation is suspended in this phase.

Figure 7:
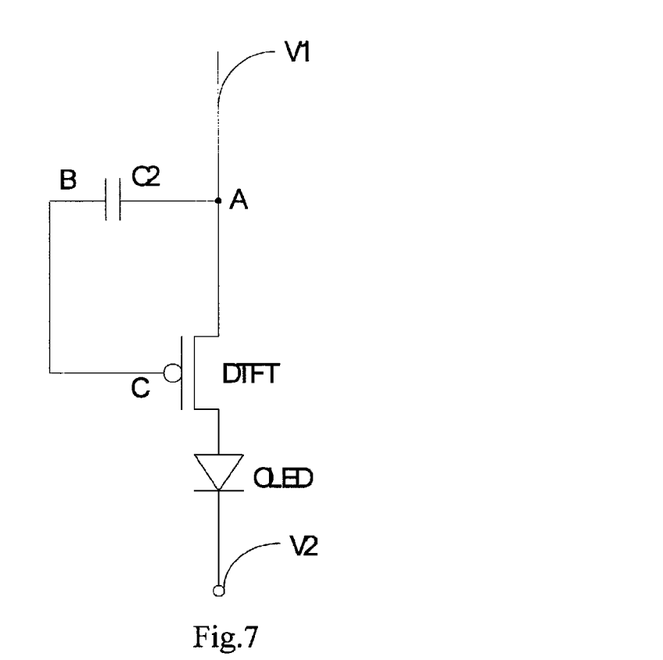
FIG. 7 is an exemplary view illustrating an equivalent circuit of the display unit in a fourth period of time according to the embodiments of the present disclosure.

Meanwhile, in the fourth phase, the fourth switch transistor T4, the sixth switch transistor T6 and the seventh switch transistor T7 of the display unit are turned off, the third switch transistor T3 and the fifth switch transistor T5 are turned on, and the first level terminal V1 and the second level terminal V2 apply the ON signal to the light-emitting device O1. Similarly, if the light-emitting module 21 shown in FIG. 1 is used, the seventh switch transistor T7 is turned on at this time, the first level terminal V1 and the second level terminal V apply the ON signal to the light-emitting device O1, and its function is as same as that in FIG. 2, therefore details are omitted herein. The equivalent circuit diagram formed at this time is shown in FIG. 7. During this process, the voltage at the first electrode of the second capacitor C2 returns to the voltage value $V_1$, which is equal to that at the first level terminal, the second electrode of the second capacitor C is float. The voltages across the first electrode and the second electrode realize an equivalent jump, then $V_B = V_C = V_1 - V_{data} - V_{th}$, the active light-emitting device starts to emit light, wherein a driving current satisfies a formula as follows:

$$I_{OLED} = K[V_{GS} - V_{th}]^2 = K[V_1 - (V_1 - V_{data} - V_{th}] - V_{th}]^2 = K \cdot V_{data}^2.$$

It can be known from the above formula that, the driving current $I_{OLED}$ is only related to the value $V_{data}$ of the voltage on the data line, therefore the driving current $I_{OLED}$ is independent of the $V_{th}$, wherein $V_{GS}$ is a voltage between the gate and source of the TFT, $$K = \frac{1}{2} \mu C_{ox} \frac{W}{L},$$

$\mu$ and $C_{ox}$ are technical processing constants, W is a channel width of the TFT, L is a channel length of the TFT, and W and L are constants which may be designed selectively.

Above descriptions take the light-emitting device being the bottom-emitting type OLED as an example, that is, the level at the first level terminal is higher than that at the second level terminal; further, those skilled in the art may conceive that the second level terminal may receive a low level directly when the light-emitting device utilizes the bottom-emitting type OLED, that is to say, a negative electrode of the OLED is connected with the low level terminal, thus the difficult for designing the circuit may be decreased and a circuit layout is easier.

The above embodiments are described by taking a case in which the first switch transistor T1, the second switch transistor T2, the third switch transistor T3, the fourth switch transistor T4, the fifth switch transistor T5, the sixth switch transistor T6, the seventh switch transistor T7, the amplifying transistor M1 and the driving transistor DTFT are all P-type transistors as an example, and of course using the transistors which are all P-type in the preparation processes of the display apparatus may be benefit the reduction of the preparation processes, and ensure uniform performance of the devices. Herein a LTPS process has advantages in that the transistor device formed by this process has high carrier mobility (the transistor may be manufactured as small as possible to enhance an aperture ratio), and in that amplifying transistor M1 have a relative higher breakdown voltage; meanwhile the signal at the gate of the amplifying transistor M1 may decrease with a touch of the fingers, therefore using the P-type transistors is easier to realize the purpose that the absolute value of the voltage difference between the gate and source of the amplifying transistor M1 (voltage at the gate Vg<voltage at the source Vs) is greater than Vth.

The types of the respective switch transistors whose gates are connected with the scan lines (the first scan line S1 or the second scan line S2) have no limitations, and may be either the N-type or the P-type. FIG. 2 is illustrated by taking a case in which all of the switch transistors are P-type as an example, but the types of transistors may be changed suitably, and after the types of the corresponding switch transistors are changed, the scan lines connected to their gates are also required to be adjusted (in a case that the signals on the scan lines are relative unchanged, the first scan line S1 is adjusted to serve as the second scan line S2, or the second scan line S2 is adjusted to serve as the first scan line S1), and such variants should fall into a scope sought for protection of the present disclosure. For example, taking the touch display circuit shown in FIG. 8 and the signal timing states shown in FIG. 9 as an example, when the second switch transistor T2, the fourth switch transistor T4, the sixth switch transistor T6 and the seventh switch transistor T7 in FIG. 2 are adjusted as the N-type switch transistors, the first scan line S1 and the second scan line S2 may utilize the same timing signal, and at this time the gates of the switch transistors whose gates are connected with the scan line (the first scan line S1 or the second scan line S2) are all connected with the second scan line and controlled by the timing signal on the second scan line. In conclusion, similar changes on the circuit connection manners by adjusting the type of the switch transistors and the connection manner between the gates and the scan lines or in combining with adjusting the timing signals on the scan lines (the first scan line S1 or the second scan line S2) may fall into the scope sought for protection by the present disclosure, and details are omitted herein. That is to say, the embodiments of the present disclosure have no limitation to the types of the respective switch transistors, as long as the corresponding signal line or the level signal applied on the signal line is adjusted when the type of the switch transistor is changed and of course it is herein subjected to that the driving method of the touch display circuit according to the embodiments of the present disclosure can be implemented. Any one of all combinations conceived easily by those skilled in the art based on the touch display circuit and the diving method thereof according to the embodiments of the present disclosure fall into the scope sought for protection by the present disclosure.

Figure 8:
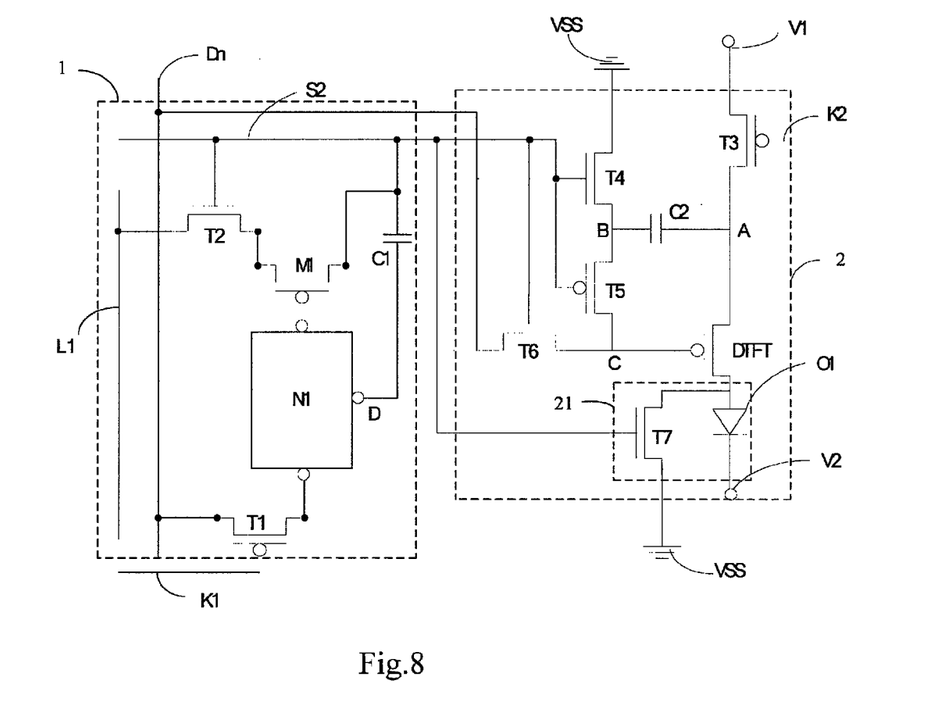
FIG. 8 is an exemplary view illustrating a circuit of a touch display circuit according to a further embodiment of the present disclosure.
Figure 9:
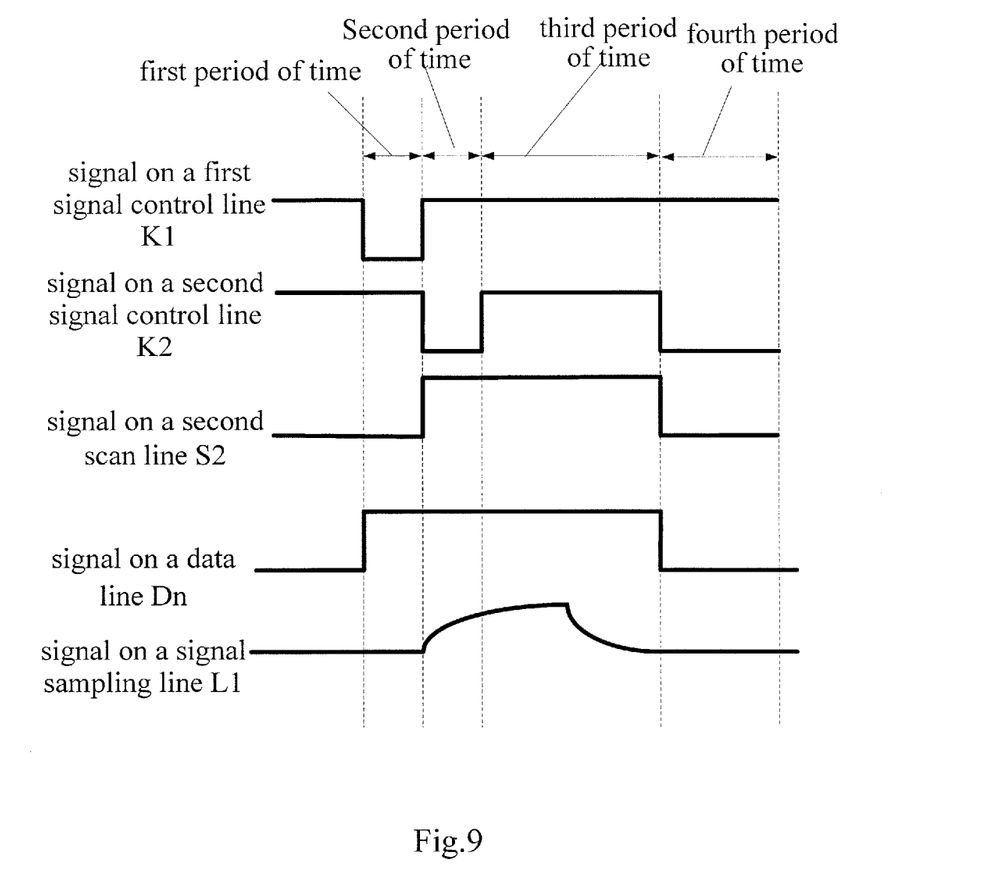
FIG. 9 is an exemplary view illustrating signal timing states of the touch display circuit shown in FIG. 8 according to the embodiments of the present disclosure.

An operational principle of the touch display circuit according to the embodiments of the present disclosure, as illustrated in FIGS. 1 and 8, may refer to the description for the touch display circuit illustrated in FIG. 2, and details are omitted herein.

In the driving method of the touch display circuit according to the embodiments of the present disclosure, a circuit of the touch unit and a circuit of the display unit are integrated together, so that the touch display circuit according to the embodiments of the present disclosure may be made simultaneously through a manufacture process for the display unit, which may in turn reduce manufacture processes in a production phase of a touch display product and save cost, and may also enhance an aperture ratio of the product and increase an additional value. Furthermore, an affect on a driving current of the active light-emitting device by a drift of the threshold voltage of the driving transistor can be avoided in a manner of voltage compensation, and in turn enhancing uniformity in the image displayed.

In a still aspect, there is provided an array substrate comprising any one of touch display circuits described above.

In the array substrate according to the embodiments of the present disclosure, a circuit of the touch unit and a circuit of the display unit are integrated together, so that the touch display circuit according to the embodiments of the present disclosure may be made simultaneously through a manufacture process for the display unit, which may in turn reduce manufacture processes in a production phase of a touch display product and save cost, and may also enhance an aperture ratio of the product and increase an additional value. Furthermore, in the display unit, an affect on a driving current of the active light-emitting device by a drift of the threshold voltage of the driving transistor can be avoided in a manner of voltage compensation, and in turn enhancing uniformity in the image displayed.

In another aspect, there is provided a display apparatus comprising the array substrate described as above. Further, the display apparatus may further be a display device such as e-Paper, a mobile phone, a television, a digital photo frame and the like.

In the display apparatus according to the embodiments of the present disclosure, a circuit of the touch unit and a circuit of the display unit are integrated together, so that the touch display circuit according to the embodiments of the present disclosure may be made simultaneously through a manufacture process for the display unit, which may in turn reduce manufacture processes in a production phase of a touch display product and save cost, and may also enhance an aperture ratio of the product and increase an additional value. Furthermore, in the display unit, an affect on a driving current of the active light-emitting device by a drift of the threshold voltage of the driving transistor can be avoided in a manner of voltage compensation, and in turn enhancing uniformity in the image displayed.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A touch display circuit comprising a touch unit and a display unit;
   wherein the touch unit comprises a first switch transistor, a second switch transistor, a first capacitor, a touch electrode, an amplifying transistor, a first scan line, and a second scan line;
   a source of the first switch transistor is connected with a data line, and a gate of the first switch transistor is connected with a first signal control line;
   a first terminal of the touch electrode is connected with a drain of the first switch transistor;
   a gate of the amplifying transistor is connected with a second terminal of the touch electrode, and a source of the amplifying transistor is connected with a second scan line;
   a gate of the second switch transistor is connected with the second scan line, a source of the second switch transistor is connected with a drain of the amplifying transistor, and a drain of the second switch transistor is connected with a signal acquiring line;
   a first electrode of the first capacitor is connected with the second scan line, and a second electrode of the first capacitor is connected with a third terminal of the touch electrode;
   the display unit comprises a light-emitting module, a second capacitor, a driving transistor, a third switch transistor, a fourth switch transistor, a fifth switch transistor and a sixth switch transistor;
   a gate of the third switch transistor is connected with a second signal control line, a source of the third switch transistor is connected with a first level terminal, and a drain of the third switch transistor is connected with a first electrode of the second capacitor;
   a gate of the fourth switch transistor is connected with the first scan line or the second scan line; a source of the fourth switch transistor is connected with a low level terminal; and a drain of the fourth switch transistor is connected with a second electrode of the second capacitor;
   a gate of the fifth switch transistor is connected with the second scan line, and a source of the fifth switch transistor is connected with the second electrode of the second capacitor;
   a gate of the sixth switch transistor is connected with the second scan line, a source of the sixth switch transistor is connected with the data line, and a drain of the sixth switch transistor is connected with a drain of the fifth switch transistor;
   a gate of the driving transistor is connected with the drain of the sixth switch transistor, and a source of the driving transistor is connected with the first electrode of the second capacitor;
   the light-emitting module is connected with the second scan line, a drain of the driving transistor and a second level terminal, and the light-emitting module is controlled by the first scan line or the second scan line, the drain of the driving transistor and the second level terminal to emit light.

2. The touch display circuit of claim 1, wherein the light-emitting module is further connected with the low level terminal, and the light-emitting module comprises a seventh switch transistor and a light-emitting device;
   a gate of the seventh switch transistor is connected with the second scan line, a source of the seventh switch transistor is connected with the drain of the driving transistor, and a drain of the seventh switch transistor is connected with the low level terminal;
   one electrode of the light-emitting device is connected with the drain of the driving transistor, and the other electrode of the light-emitting device is connected with the second level terminal.

3. The touch display circuit of claim 1, wherein the light-emitting module comprises a seventh switch transistor and a light-emitting device;
   a gate of the seventh switch transistor is connected with the second scan line, and a source of the seventh switch transistor is connected with the drain of the driving transistor;
   one electrode of the light-emitting device is connected with the drain of the seventh switch transistor, and the other electrode of the light-emitting device is connected with the second level terminal.

4. The touch display circuit of claim 1, wherein switch-on time of the fifth switch transistor and that of the fourth switch transistor do not overlap.

5. The touch display circuit of claim 1, wherein the second switch transistor, the fourth switch transistor and the sixth switch transistor are switch transistors having a same type, and their gates are all connected with a same scan line.

6. The touch display circuit of claim 1, wherein both of the driving transistor and the amplifying transistor are P-type transistors.

7. The touch display circuit of claim 1, wherein the driving transistor, the amplifying transistor, and the respective switch transistors are all P-type transistors.

8. A driving method for the touch display circuit of claim 1, comprising:
   in a first phase, turning on both the first switch transistor and the fifth switch transistor, turning off the second switch transistor, the third switch transistor, the fourth switch transistor, the sixth switch transistor, the driving transistor and the amplifying transistor, and inputting the data line a reset signal of a high level, so that a voltage at the touch electrode rises;
   in a second phase, turning off the first switch transistor and the fifth switch transistor, turning on the second switch transistor, the third switch transistor, the fourth switch transistor, the sixth switch transistor and the amplifying transistor, and charging the second capacitor via the first level terminal;
   in a third phase, turning off the first switch transistor, the third switch transistor and the fifth switch transistor, turning on the second switch transistor, the fourth switch transistor, and the sixth switch transistor, supplying the second scan line with a coupling pulse signal of a high level, discharging the second electrode of the first capacitor until a voltage difference between the gate and the source of the amplifying transistor is equal to a threshold voltage of the amplifying transistor when the touch electrode is touched, amplifying the coupling pulse signal provided from the second scan line and outputting the same to the signal acquiring line by the amplifying transistor, and discharging the second capacitor until the voltage difference between the gate and the source of the driving transistor is equal to the threshold voltage of the driving transistor; and
   in a fourth phase, turning off the first switch transistor, the second switch transistor, the fourth switch transistor, the sixth switch transistor and the amplifying transistor, turning on the third switch transistor and the fifth switch transistor, applying a light-emitting signal to the light-emitting module via the first level terminal and the second level terminal.

9. The driving method of claim 8, wherein the light-emitting module comprises a seventh switch transistor and a light-emitting device, and when a source and a drain of the seventh switch transistor are connected with two electrodes of the light-emitting device in parallel, the method further comprises:
   turning off the seventh switch transistor in the first phase;
   turning on the seventh switch transistor in the second phase;
   turning on the seventh switch transistor in the third phase; and
   turning off the seventh switch transistor in the fourth phase, and applying a turn-on signal to the light-emitting device via the first level terminal and the second level terminal.

10. The driving method of claim 8, wherein the light-emitting module comprises a seventh switch transistor and a light-emitting device, and when a source and a drain of the seventh switch transistor are connected with two electrodes of the light-emitting device in series, the method further comprises:
    turning on the seventh switch transistor in the first phase;
    turning off the seventh switch transistor in the second phase;
    turning off the seventh switch transistor in the third phase; and
    turning on the seventh switch transistor in the fourth phase, and applying a turn-on signal to the light-emitting device via the first level terminal and the second level terminal.

11. The driving method of claim 8, wherein switch-on time of the fifth switch transistor and that of the fourth switch transistor do not overlap.

12. An array substrate comprising the touch display circuit of claim 1.

13. The array substrate of claim 12, wherein the light-emitting module is further connected with the low level terminal, and the light-emitting module comprises a seventh switch transistor and a light-emitting device;
    a gate of the seventh switch transistor is connected with the second scan line, a source of the seventh switch transistor is connected with the drain of the driving transistor, and a drain of the seventh switch transistor is connected with the low level terminal;
    one electrode of the light-emitting device is connected with the drain of the driving transistor, and the other electrode of the light-emitting device is connected with the second level terminal.

14. The array substrate of claim 12, wherein the light-emitting module comprises a seventh switch transistor and a light-emitting device;
    a gate of the seventh switch transistor is connected with the second scan line, and a source of the seventh switch transistor is connected with the drain of the driving transistor;

one electrode of the light-emitting device is connected with the drain of the seventh switch transistor, and the other electrode of the light-emitting device is connected with the second level terminal.

15. The array substrate of claim 12, wherein switch-on time of the fifth switch transistor and that of the fourth switch transistor do not overlap.

16. The array substrate of claim 12, wherein the second switch transistor, the fourth switch transistor and the sixth switch transistor are switch transistors having a same type, and their gates are all connected with a same scan line.

* * * * *